United States Patent
Roberts et al.

(10) Patent No.: US 10,164,639 B1
(45) Date of Patent: Dec. 25, 2018

(54) VIRTUAL FPGA MANAGEMENT AND OPTIMIZATION SYSTEM

(71) Applicant: Advanced Micro Devices, Inc., Sunnyvale, CA (US)

(72) Inventors: David A. Roberts, Boxborough, MA (US); Andrew G. Kegel, Bellevue, WA (US); Elliot H. Mednick, Boxborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/812,411

(22) Filed: Nov. 14, 2017

(51) Int. Cl.
*H03K 19/177* (2006.01)
*G06F 17/50* (2006.01)
*G06F 15/78* (2006.01)

(52) U.S. Cl.
CPC ... *H03K 19/17732* (2013.01); *G06F 15/7892* (2013.01); *G06F 17/5045* (2013.01); *H03K 19/1776* (2013.01); *H03K 19/17728* (2013.01); *H03K 19/17756* (2013.01)

(58) Field of Classification Search
CPC ....... H03K 19/17732; H03K 19/17728; H03K 19/17756; H03K 19/1776; G06F 17/5045; G06F 17/5054; G06F 15/7892; G06F 15/7867
USPC .......................................................... 326/38
See application file for complete search history.

(56) References Cited

U.S. PATENT DOCUMENTS

| | | | |
|---|---|---|---|
| 5,737,631 A | 4/1998 | Trimberger | |
| 6,091,263 A | 7/2000 | New et al. | |
| 6,237,054 B1 | 5/2001 | Freitag | |
| 7,180,324 B2 | 2/2007 | Chan et al. | |
| 7,243,221 B1 | 7/2007 | Ryser | |
| 7,410,884 B2 | 8/2008 | Ramanathan et al. | |
| 7,902,865 B1 | 3/2011 | Cheng et al. | |
| 8,458,720 B2 * | 6/2013 | Bansal | G06F 9/5066 718/103 |
| 8,928,351 B1 | 1/2015 | Konduru | |

(Continued)

FOREIGN PATENT DOCUMENTS

WO 2017117122 A1 7/2017

OTHER PUBLICATIONS

Asiatici, M., George, N., Vipin, K., Fahmy, S. A., & Ienne, P. (2017). Virtualized execution runtime for FPGA accelerators in the cloud. Ieee Access, 5, 1900-1910.

(Continued)

*Primary Examiner* — Daniel D Chang
(74) *Attorney, Agent, or Firm* — Liang & Cheng, PC (57) ABSTRACT

A macro scheduler includes a resource tracking module configured to update a database enumerating a plurality of macro components of a set of field programmable gate array (FPGA) devices, a communication interface configured to receive from a first client device a first design definition indicating one or more specified macro components for a design, resource allocation logic configured to allocate a first set of macro components for the design by allocating one of the plurality of macro components for each of the one or more specified macro components indicated in the first design definition, and configuration logic configured to implement the design in the set of FPGA devices by configuring the first set of allocated macro components according to the first design definition.

20 Claims, 5 Drawing Sheets

(56) References Cited

U.S. PATENT DOCUMENTS

| | | | |
|---|---|---|---|
| 2015/0113538 A1* | 4/2015 | Giroux | G06F 9/5011 718/104 |
| 2015/0155876 A1 | 6/2015 | Jayasena et al. | |
| 2016/0212065 A1* | 7/2016 | To | H04L 47/783 |

OTHER PUBLICATIONS

Brown, Stephen, and Jonathan Rose. "Architecture of FPGAs and CPLDs: A tutorial." IEEE Design and Test of Computers 13.2 (1996): 42-57.

Campi F et al: "A VLIW processor with reconfigurable instruction set for embedded applications", IEEE Journal of Solid-State Circuits, IEEE Service Center, Piscataway, NJ, USA, vol. 38, No. 11, Nov. 1, 2003 (Nov. 1, 2003), pp. 1876-1886, XP011102775, ISSN: 0018-9200, 001: 10. 1109/JSSC.2003.818292 figures 2-5 figure 8 p. 1878, right-hand column, 1ine 7-1ine 20 p. 1880, left-hand column, 1ine 25-1ine 37.

Interational Search Report, Application No. PCT/US2016/032504 dated Sep. 1, 2016.

Rose, Jonathan, Abbas El Gamal, and Alberto Sangiovanni-Vincentelli. "Architecture of field-programmable gate arrays." Proceedings of the IEEE 81.7 (1993): 1013-1029.

Tapp, Stephanie. "Bpi fast configuration and impact flash programming with 7 series fpgas." (Feb. 9, 2015). Xilinx, Inc.

International Search Report and Written Opinion of the International Searching Authority, Application No. PCT/US2018/042172 dated Oct. 23, 2018.

Marescaux, T., Nollet, V., Mignolet, J. Y., Bartic, A., Moffat, W., Avasare, P., . . . & Lauwereins, R. (2004). Run-time support for heterogeneous multitasking on reconfigurable SoCs. Integration, the VLSI journal, 38(1), 107-130.

Rana, V., Santambrogio, M., Sciuto, D., Kettelhoit, B., Koester, M., Porrmann, M., & Ruckert, U. (Mar. 2007). Partial dynamic reconfiguration in a multi-fpga clustered architecture based on linux. In 2007 IEEE International Parallel and Distributed Processing Symposium (p. 173). IEEE.

Santambrogio, M. D., Cancare, F., Cattaneo, R., Bhandariy, S., & Sciuto, D. (May 2012). An Enhanced Relocation Manager to Speedup Core Allocation in FPGA-based Reconfigurable Systems. In Parallel and Distributed Processing Symposium Workshops & PhD Forum (IPDPSW), 2012 IEEE 26th International (pp. 336-343). IEEE.

* cited by examiner

VIRTUAL FPGA MANAGEMENT AND OPTIMIZATION SYSTEM

GOVERNMENT RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

A field-programmable gate array (FPGA) is an integrated circuit device that is designed to be configured by an end user after manufacturing. In general, an FPGA includes an array of uncommitted circuit elements, called logic blocks, that are connected together by interconnect resources making up a programmable interconnect fabric. The interconnect resources may include, for example, logic gates that can be inter-wired in different configurations. The logic blocks in the FPGA can be configured to perform complex combinational functions, or logic functions such as AND or XOR. Logic blocks in an FPGA can also include memory elements, which may be implemented as simple flip-flops or more complete blocks of memory.

In an FPGA, the logic blocks can include elements such as lookup tables (LUTs) and other fixed functions that are programmed by inserting values into small Static Random Access Memories (SRAMs) or registers. The programming must be performed before the logic blocks can be used. After programming, each combination of function inputs to an LUT results in a predefined output, allowing implementation of any logic function. A typical FPGA relies on an external memory device and a single, relatively slow serial programming port for configuration. The FPGA typically has a "configuration mode" and a separate "user mode" where the entire chip is either in an idle state waiting to be programmed, or the programmed chip is running.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Modern datacenters may provide a variety of computing resources for their clients, including field programmable gate array (FPGA) devices that can be used as fixed resources or as user-configurable resources for executing client workloads. Some FPGA devices may be specifically designed for use in such datacenters. However, existing datacenters using FPGA devices may still allocate FPGA hardware resources inefficiently, particularly when multiple independent clients are requesting use of the resources. Accordingly, such datacenters can benefit from an interface that enables FPGA virtualization, so that the FPGA hardware resources can be more efficiently allocated when servicing multiple clients through resource sharing, time multiplexing, and other optimizations.

In one embodiment, a datacenter supports virtualization of its FPGA devices by organizing FPGA hardware resources into logical units called macro components, such that accelerator designs can be specified as macro graphs defining connections between macro components. One or more FPGA macro schedulers for scheduling use of the macro components are integrated in the FPGA devices themselves and/or are operated as standalone units connected to the FPGA devices through a network or system interconnect.

In one embodiment, an FPGA device includes a number of different types of macro components, which represent hardware resources such as input/output (I/O) ports, configurable logic block (CLB) regions, hardened blocks, or other combinations of circuit components, which can be used for coarse-grained allocation, placement, and routing of FPGA hardware resources for implementing application-specified hardware accelerator functions. The macro component thus functions as the unit of logic placement for shared FPGA devices in the datacenter. Scheduling of macro components is much simpler (e.g. the first free macro component can be allocated for a request) than performing a full synthesis, place and route process on the FPGA on demand. Synthesis, place and route can be performed offline for macro blocks that include more complex pre-compiled circuits.

In one embodiment, the FPGA devices each include a local FPGA macro scheduler that performs virtualized resource allocation, scheduling, and hardware optimization for the FPGA device in which it is integrated. In addition, the datacenter also includes a standalone FPGA macro scheduler unit which is networked with other components on a system or memory interconnect. The standalone FPGA macro scheduler provides a more powerful computing resource that can be dedicated to macro scheduling and management tasks for FPGAs in the network that do not have local macro schedulers. The standalone FPGA macro scheduler may also perform additional optimizations and management tasks for FPGA devices that already have local macro schedulers, since the local macro schedulers may be limited in computing power or may have a more limited view of the tasks being requested by a wider range of clients.

In one embodiment, the local and/or standalone macro schedulers provide an application programming interface (API) that allocates and schedules macro components according to a design definition for an accelerator to be implemented in one or more of the FPGA devices. The design definition includes code that specifies a macro graph, in which the accelerator is defined in terms of connections between macro components and configurations for the macro components. Through the use of the API, a user can thus create a function to be implemented in a hardware accelerator, and can also assign input data for the function and read the resulting outputs in a virtualized manner.

Figure 1:
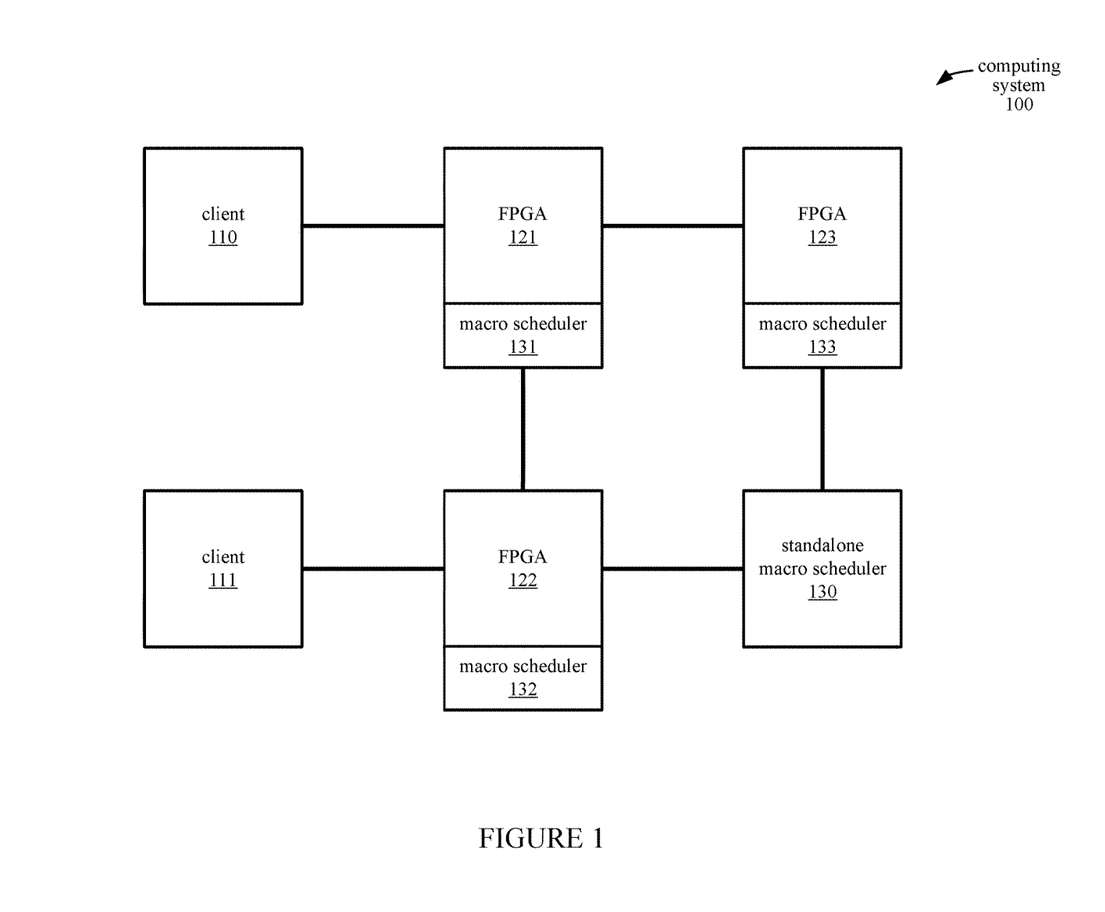
FIG. 1 illustrates an embodiment of a computing system that supports virtualization of hardware resources in a set of field programmable gate array (FPGA) devices.

FIG. 1 illustrates a computing system 100 that includes macro schedulers 130-133 for scheduling tasks and allocating resources of multiple FPGA devices 121-123, according to an embodiment. The macro schedulers 130-133 in the computing system 100 enable virtualization of FPGA accelerators implemented in the FPGA devices 121-123. In one embodiment, the computing system 100 represents a portion of a datacenter that provides computing resources to multiple client devices such as clients 110 and 111. The components of the computing system 100 can communicate with each other over various channels, such as a system or memory interconnect or a local or wide area network, and may be connected in topologies other than the one illustrated.

In the computing system 100, each of the FPGA devices 121-123 has a local macro scheduler 131-133, respectively, to place (i.e., physically map) and optimize concurrent accelerators to be implemented in the FPGA. For example, the macro scheduler 131 would determine which physical hardware resources on the FPGA 121 to use for concurrently implementing a collection of accelerators in FPGA 121. The computing system 100 also includes a standalone macro scheduler 130 that is able to perform global (i.e., cross-FPGA) allocation and scheduling. The standalone macro scheduler 130 has access to requests from multiple clients (e.g., 110 and 111) and tracks the resources of multiple FPGA devices (e.g., 121-123), and can therefore identify a greater number of optimal placements and schedules. In addition, the standalone macro scheduler 130 operates in a separate location from the FPGA devices 121-123 and therefore can operate without being restricted by the thermal constraints of the FPGAs 121-123. Accordingly, the macro scheduler 130 can be a much more powerful computer capable of synthesizing co-scheduled register transfer level (RTL) designs for faster and more compact implementations.

In one embodiment, the clients 110 and 111 are remote clients that are connected to the other components of the computing system 100 via network connections. Clients 110 and 111 can request configuration of FPGA devices 121-123 to implement specified hardware accelerators and can also define tasks to be executed in the hardware accelerators. The clients 110 and 111 provide design definitions, task definitions, and other information (e.g., configuration bitfiles) to an API in the standalone macro scheduler 130, or in the local macro schedulers 131-133. The macro schedulers 130-133 allocate hardware resources of the FPGAs 121-123 and schedule task execution in response to the clients' requests. In one embodiment, access keys, encrypted communication, and/or other security measures are used to prevent malicious clients or processes from affecting other tasks.

The FPGAs 121-123 include uncommitted circuit elements called configurable logic blocks (CLBs) that can be connected by programmable interconnect elements. The CLBs in each FPGA include lookup tables and other fixed functions that can be configured by inserting values into specific static random access memory (SRAM) locations or registers in the FPGA. CLBs can thus be configured to perform arbitrary logic functions, as specified by a client device.

The macro schedulers 130-133 in the computing system 100 perform the functions of allocating hardware resources of the FPGAs 121-123 for implementing the requested accelerator configurations and scheduling the requested tasks for execution in the accelerators. The macro schedulers 130-133 also perform context switching to allow switching between tasks and configurations (i.e., bitstream swapping). For example, a context switch may entail saving the register and memory state for a configured region (e.g., including a set of configured macro components), restoring a previously saved state to the same region, and reconfiguring the region for executing a different task. The previously saved state can then be restored to resume execution of the original task at a later time. In one embodiment, a macro scheduler having sufficient computing resources performs a second-pass optimization, in which the synthesis and/or place and route processes are performed to generate a more optimal configuration of an already executing design, then execution is paused to replace the original configuration with the new optimal configuration.

Computing system 100 includes both local macro schedulers 131-133 and a standalone macro scheduler 130. Alternative embodiments may include fewer or more local macro schedulers and/or standalone macro schedulers. The local macro schedulers 131-133 perform the functions described above with respect to the FPGA devices in which they reside; for example, macro schedulers 131-133 determine placement of allocated macro components in their own respective FPGA devices 121-123. The standalone macro scheduler 130 is connected via network channels (e.g., system or memory interconnects) to multiple FPGA devices 121-123 and can perform allocation, scheduling, and optimization functions for any of the connected FPGA devices 121-123. In one embodiment, the standalone macro scheduler 130 can perform these functions for FPGA devices that do not have their own local macro schedulers. The standalone macro scheduler 130 receives function calls from the clients 110 and 111, and based on the function calls, allocates macro components for performing requested tasks, performs synthesis and place and route for designs received from the clients 110 and 111. The macro scheduler 130 also manages permissions and issues notifications to the clients.

Figure 2:
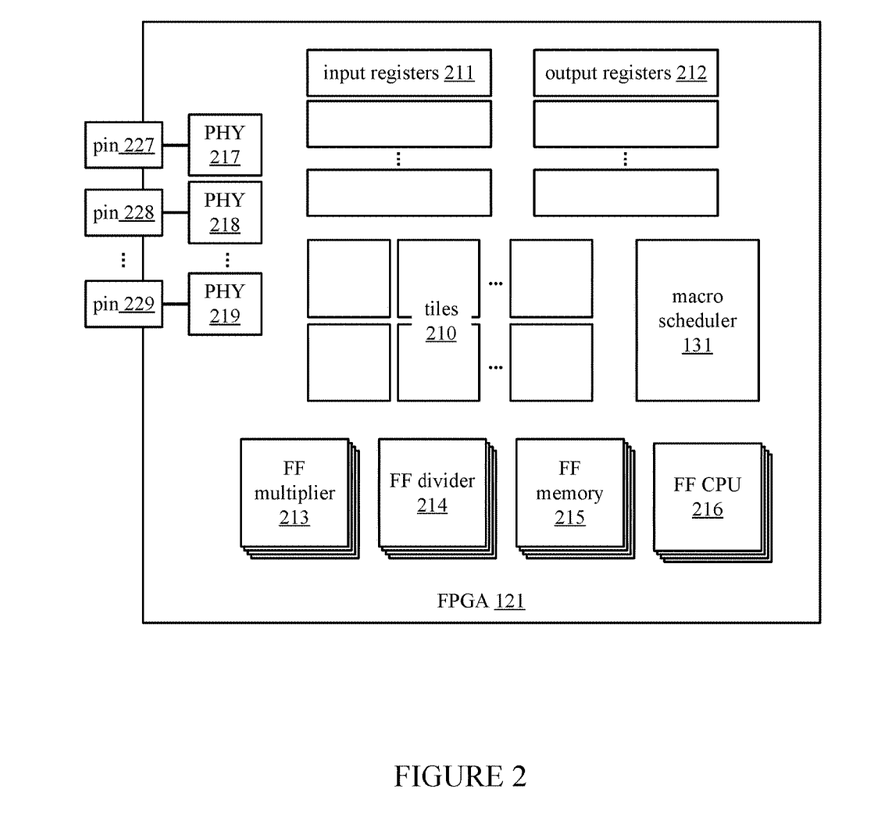
FIG. 2 illustrates macro components in an FPGA device, according to an embodiment.

FIG. 2 illustrates an FPGA device 121 that includes hardware resources in the form of multiple macro components 210-219. A macro component includes a collection of smaller hardware components that are treated as a single unit for the purposes of allocation and scheduling. Some macro components are highly configurable, while others perform a single fixed function. The macro components 210-219 in the FPGA 121 include programmable tiles 210, input registers 211, output registers 212, fixed function blocks 213-216, and physical input/output (I/O) blocks 217-219.

Each of the tiles 210 is a programming region that includes CLBs, switches, fixed function blocks, and interconnects that can be programmed independently from other tiles. A tile can be associated with a bitfile, which is a file containing a synthesized, placed and routed design for the tile. Depending on the size or complexity of a function, a macro scheduler 130 or 131 may allocate multiple physical tiles to implement the function.

The FPGA 121 also includes a set of input registers 211 and output registers 212. The input registers 211 provide input data to a function that is implemented in the FPGA 121, while output registers 212 provide the resulting output data from the function. In one embodiment, the input registers 211 and output registers 212 are implemented as queues (e.g., first-in-first-out (FIFO) buffers) for higher performance. The FPGA 121 can be configured so that the input registers 211 and output registers 212 are connected to external pins of the FPGA (e.g., pins 227-229) via physical input/output (I/O) blocks (e.g., PHY blocks 217-219) and thus made accessible to external devices and processes. The PHY blocks 217-219 provide access to I/O resources such as transceivers, and are connected to the pins 227-229 of the FPGA.

The FPGA 121 also includes different types of fixed function (FF) blocks 213-216. FF block 213 is a multiplier block, FF block 214 is a divider block, FF block 215 is a memory block, and FF block 216 is a central processing unit block. The FPGA 121 can include multiple instances of each type of fixed function block. Alternative embodiments of FPGA 121 can include other types of FF blocks that perform different functions.

Figure 3:
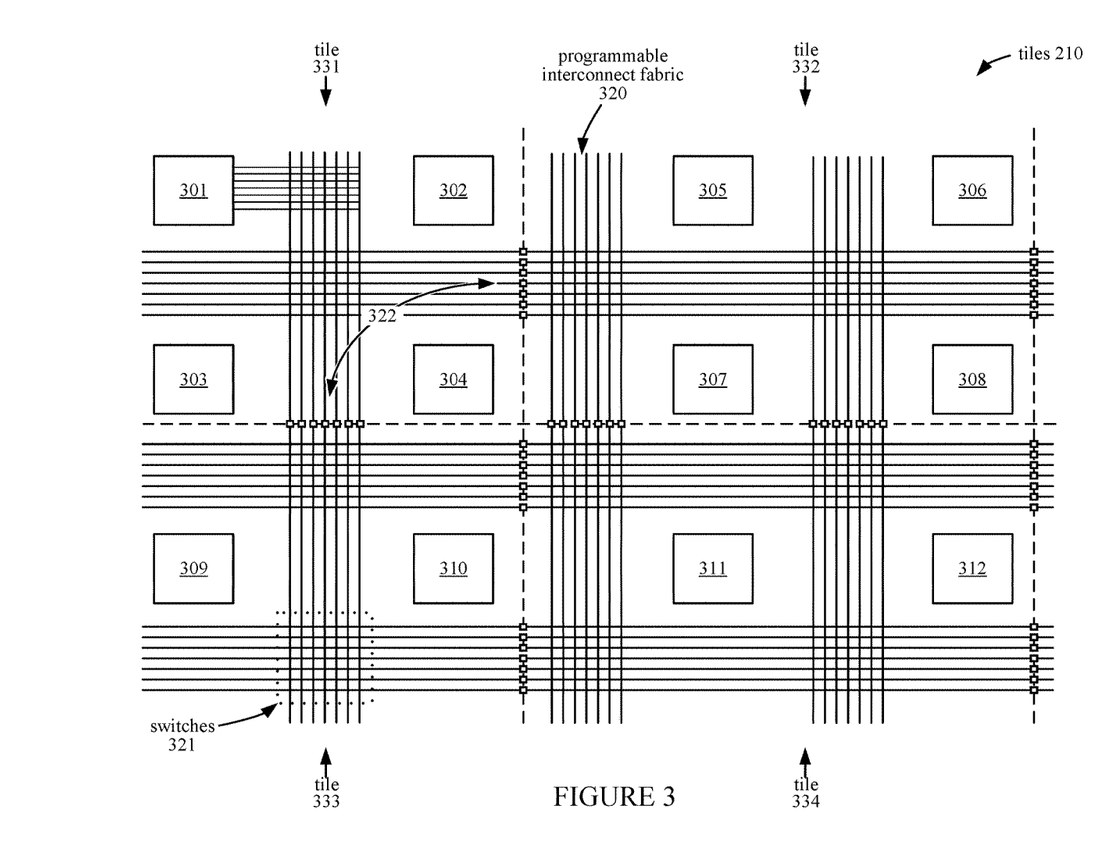
FIG. 3 illustrates programmable tiles in an FPGA, according to an embodiment.

FIG. 3 illustrates internal components of the tiles 210 in the FPGA 121, according to an embodiment. The tiles 210 are programming regions that include an array of configurable logic blocks (i.e., blocks 301-312) and interconnect resources 320-322 used to selectively connect the logic blocks 301-312.

In the FPGA 121, the boundaries of tiles 210 are indicated by the dashed lines. Tile 331 includes logic blocks 301-304, tile 332 includes logic blocks 305-308, tile 333 includes logic blocks 309 and 310, and tile 334 includes logic blocks 311 and 312. The tiles 331-334 divide the programmable logic contained in the FPGA 121 into separate configuration domains, which can be operated and programmed independently of each other, or combined to operate as larger programmable regions. Reconfiguration of the hardware in one tile can take place while a different tile is being used to execute one or more instructions.

As illustrated in FIG. 3, the tiles 331 and 332 each include four configurable logic blocks, while the tiles 333 and 334 each include two configurable logic blocks. Thus, a given tile need not have the same number of configurable logic blocks as another tile in the same programmable device. In alternative embodiments, tiles may include fewer or more than the illustrated number of configurable logic blocks.

Each of the configurable logic blocks 301-312 includes lookup tables (LUTs) and fixed function blocks. After programming, each combination of function inputs to an LUT results in a predefined output, allowing for the implementation of arbitrary logic functions. Each of the configurable logic blocks can be programmed to perform various functions by writing appropriate values into the LUTs and into configuration memory regions or registers that control the connections between the components (e.g., LUTs, fixed function blocks, etc.) in the logic block.

The configurable logic blocks 301-312 are each connected to a programmable interconnect fabric 320, which includes conductive traces and switches that allow the blocks 301-312 to be selectively connected to each other. In FIG. 3, conductive traces are illustrated connecting the configurable logic 301 to the programmable interconnect fabric 320. The other blocks 302-312 are also connected to the interconnect fabric 320 via conductive traces; however, the conductive traces connecting these blocks 302-312 to the interconnect fabric 320 are omitted from the illustration for the sake of clarity.

The programmable interconnect fabric 320 may in alternative embodiments be less uniform than illustrated in FIG. 3. For example, the interconnect fabric may include conductive traces that have different lengths or may have different numbers of parallel conductive traces in different regions of the FPGA 121. The conductive traces of the interconnect fabric 320 are connected to each other by switches where they intersect. For example, region 321 (indicated by the dotted lines) where multiple traces intersect includes a switch between each intersection between two conductive traces. Alternatively, switches may be present at only some of the intersections in region 321.

The programmable interconnect fabric also includes boundary switches, such as switches 322, that can be used to selectively isolate the components in one tile from the other tiles. The boundary switches are located at the boundaries of the tiles 331-334 in the FPGA 121. For example, the boundary switches 322 are located where the conductive traces of the programmable interconnect fabric 320 cross the boundary of the tile 331.

Accordingly, the boundary switches 322 can be used to disconnect the configurable logic blocks 301-304 and other components of the tile 331 from the other tiles 332-334. Additionally, boundary switches can be selectively closed or opened in order to combine tiles. For example, the boundary switches 322 that are between tiles 331 and 332 can be closed to combine tiles 331 and 332 with each other while the other boundary switches remain open to isolate the combined tile 331 and 332 from the other tiles 333 and 334.

Figure 4:
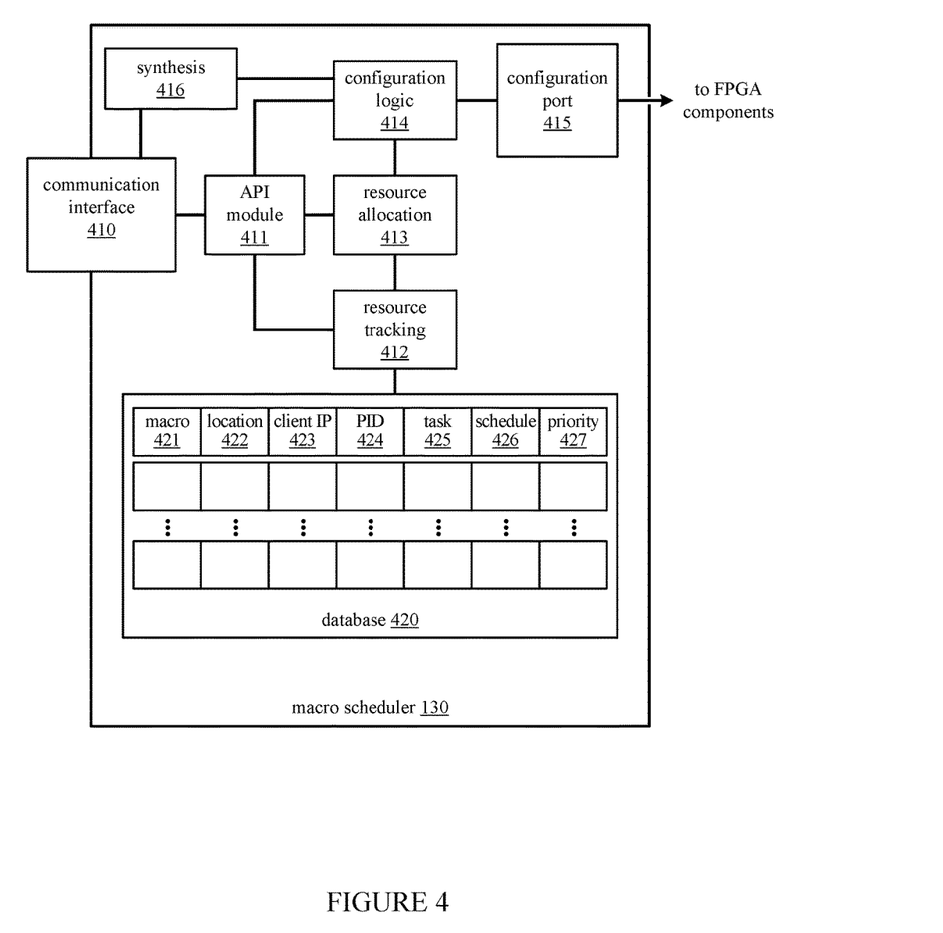
FIG. 4 illustrates an embodiment of a macro scheduler.

FIG. 4 illustrates a functional block diagram for a stand-alone macro scheduler 130, according to an embodiment. The functional blocks included in the macro scheduler 130 represent operations that can be performed in the macro scheduler 130, and are implemented using hardware, such as circuit modules, or using a combination of hardware and software. The macro scheduler 130 is connected to the other components in computing system 100, such as the FPGA devices 121-123 and the client devices 110 and 111 via network channels, such as system and/or memory interconnects.

The macro scheduler 130 is connected to the network channels via a communication interface 410. The application programming interface (API) module 411 receives design definitions, function calls, and other commands from the clients 110 and 111 via the communication interface 410, and responds to these inputs by invoking the requested functions of the macro scheduler 130, such as allocation of macro components by the resource allocation logic 413, configuration of tiles by the configuration logic 414, etc.

The hardware design for a particular task requested by the client devices 110-111 generally does not consume all of the hardware resources on any single FPGA; thus, spare hardware resources of the FPGA can be allocated to other accelerated functions requested by the same process, other processes from the same client, or processes from other clients. In order to allow multiple designs to be rapidly scheduled (i.e., "placed") on a shared FPGA device for multiple concurrent designs, a design definition describes the hardware configuration at an abstraction level that is higher than the register transfer level (RTL).

In one embodiment, the design definition received by the API module 411 indicates one or more specified macro components for a design in a macro graph for the design. The macro graph indicates the types of the macro components used and how the specified macro components are configured and connected. The macro graph can include macro components such as input and output registers, collections of CLBs (e.g., tiles), lookup tables, routing resources, and fixed function blocks (e.g., multipliers, dividers, memory, CPUs, etc.).

The macro graph also associates a filename of a bitfile with each of the tiles specified in the macro graph. In one embodiment, bitfiles are generated by a synthesis process performed on the design by one of the client devices 110-111. The bitfile includes configuration data that can be stored in a configuration register to configure the tile to implement at least a portion of the design (e.g., one or more hardware accelerators).

The following pseudo code is an example of a design definition including a macro graph, according to an embodiment:

myAccelerator=new MGCreateGraph( );
  inA=new MGInReg( );
  inB=new MGInReg( );
  outC=new MGOutReg( );
  myLogic=new MGTile("tile_file.bit");
  myLogic.setInputs(inA, inB);
  myLogic.setOutputs(outC);
  myAccelerator.addComponent(myLogic);

In the above code, 'myAccelerator' is a macro graph that includes four macro components: input registers 'inA' and 'inB', output register 'outC', and tile 'myLogic'. The tile 'myLogic' is instantiated with a constructor 'MGTile( )' that indicates a bitfile 'tile_file.bit' that includes the configuration data for programming the tile. The 'myLogic.setInputs( )' function connects the tile 'myLogic' to the input registers 'inA' and 'inB'. The 'myLogic.setOutputs( )' function connects 'myLogic' to the output register 'outC'. Finally, the 'myAccelerator.addComponent( )' function is used to add the tile 'myLogic' to the macro graph 'myAccelerator' for the accelerator.

A design definition can be referenced by a task definition received from one of the client devices 110-111. The task definition is received by the API module 411, and defines a task to be executed using the macro graphs specified in the design definition. An example task definition is provided below:

myFPGA=getFreeFPGAaccelerator( );
  myFPGA.program(myAccelerator);
  inA.writeDataSequence(1, 2, 3, 4, 5);
  inB.writeDataSequence(6, 7, 8, 9, 10);
  myFPGA.execute( );
  myResults=outC.read( );

The 'getFreeFPGAacceler( )' function returns an unused FPGA to the 'myFPGA' variable. The following function call 'myFPGA.program(myAccelerator)' then invokes programming of the returned FPGA based on the 'myAccelerator' macro graph, as previously defined in the example design definition. The following functions 'inA.writeDataSequence(1, 2, 3, 4, 5)' and 'inB.writeDataSequence(6, 7, 8, 9, 10)' specify input data for the input buffers 'inA' and 'inB'. In alternative embodiments, pointers to memory (e.g., on the FPGA) can be stored in the input buffers instead of arrays of values. The function call 'myFPGA.execute( )' begins execution of the task in the configured accelerator, and 'myResults=outC.read( )' reads the results of the execution from the output register 'outC'. The task definition thus specifies a macro graph to be used for the task, specifies input data, requests execution, and requests reading of the resulting output data.

The macro scheduler 130 includes a database 420 that is updated by a resource tracking module 412 and that enumerates the macro components in the FPGA devices 121-123. In one embodiment, the database 420 includes a row for each of the macro components that stores a unique identifier for the macro component in a 'macro' field 421 and stores a location of the macro component in a 'location' field 422. In one embodiment, the 'location' field stores an identifier for the FPGA in which the macro component resides, and/or an address of configuration memory for the macro component. When one of the client devices 110 or 111 requests implementation of a design that uses a particular macro component, the resource tracking module 412 updates the database 420 to associate the client network address (e.g., internet protocol (IP) address) and operating system (OS) process identifier (PID) with the macro component by storing the client's network address in the 'client IP' field 423 and storing the PID in the 'PID' field 424. The task that is being executed using the macro can also be associated with the macro by writing an identifier for the task in the 'task' field 425. In one embodiment, the database 420 includes a 'schedule' field 426 for recording schedule information; for example, the 'schedule' field 426 may indicate the time periods for which the macro component is allocated to the client, PID, and task in fields 423-425, respectively. The database 420 also includes a 'priority' field 427 that is used to store a priority indication. In one embodiment, the priority indication is user-selectable and provides a way for a user to influence scheduling depending on task priority. For example, a user may select a higher priority for a task, allowing the task to interrupt other tasks already in progress that have a lower priority.

In one embodiment, multiple macro components can be associated with the same client and/or the same task. In alternative embodiments, the database 420 includes additional fields for recording usage cost, context identifiers, or other values related to allocation, scheduling, or programming of the macro components. These additional fields can also be updated by the resource tracking module 412.

The macro scheduler 130 includes a resource allocation module 413 that allocates macro components in response to client requests received at the API 411. In response to a design definition, the resource allocation module 413 allocates a set of macro components for the design by, for each macro component specified in the design definition, querying the database 420 for an available macro component of the same type, and allocating the available macro component for use in the design. Continuing the previous example, the design definition specifies input registers 'inA' and 'inB', output register 'outC', and tile 'myLogic'; accordingly, the resource allocation logic 413 queries database 420 to find two input registers, an output register, and a tile and allocates these macro components for implementing 'myAccelerator'.

In one embodiment, the macro components are allocated to the design when executing 'myFPGA.program(myAccelerator)' according to the task definition. In one embodiment, the availability of macro components over time is indicated by the 'schedule' field 426 in the database 420. If not enough macro components are available to implement the requested design, the task can be scheduled for a later time when enough macro components are available, as determined based on the 'schedule' field 426.

The macro scheduler 130 thus performs on-demand high speed allocation of FPGA resources in response to design and task definitions received from client devices via the API 411. In one embodiment, the resource allocation module 413 in the macro scheduler 130 also performs a scheduling function by controlling the timing for configuring allocated macro components and for executing the requested tasks in the configured macro components. In one embodiment, the resource allocation module 413 also performs a context switching and management function. Accordingly, the resource allocation module 413 may pause a task and save the register and memory states of any accelerators being used by the task along with their configuration data (e.g., bitfiles or bitstreams) so that the task execution can be resumed at a later time. This context switching allows time multiplexing of hardware resources (e.g., allowing an executing task to be temporarily interrupted by a higher priority task).

Because the macro scheduler 130 has access to information about tasks from multiple clients 110-111 and macro components of multiple FPGA devices 121-123, the macro scheduler 130 is able to identify opportunities for optimization that would not otherwise be identified for client devices that do not communicate or cooperate with each other. In one embodiment, the macro scheduler 130 optimizes resource usage for concurrently executed tasks.

In one embodiment, the macro scheduler 130 allows a single configured accelerator to be shared between two different tasks initiated by the same client device or from different client devices. For example, a first client device 110 may submit a first design definition for executing a first task, where the design definition includes a definition for an accelerator to be implemented from macro components in the FPGA devices 121-123. If a second design definition for executing a second task from client 111 requests the use of an identical accelerator design, the resource allocation logic 413 can configure a single accelerator to be used by both the first task and the second task. The resource allocation logic 413 multiplexes usage of the accelerator over time by scheduling execution of the first task in the accelerator during a first time period, and scheduling execution of the second task during a second time period that does not overlap with the first time period.

In one embodiment, the macro scheduler 130 allows hardware resources (e.g., macro schedulers) of a single FPGA device to be shared between two different designs from the same or different client devices. In particular, the resource allocation logic 413 allocates macro components from an FPGA device for a first design requested by a first client (e.g., client 110), and then allocates macro components from the same FPGA device for a second design requested by a second client (e.g., client 111). Different macro components of a single FPGA device can thus be shared among multiple designs. In one embodiment, the resource allocation logic 413 may also allocate portions of a single macro component among different designs. For example, two different designs may each use less than half of a memory macro component; accordingly, the resource allocation logic 413 can allocate a single memory macro component to be shared between the two designs, with the first design utilizing an upper portion of the memory and the second design utilizing a lower portion of the memory.

In one embodiment, the macro scheduler 130 can allocate macro components from multiple FPGA devices to be used in a single accelerator. In other words, a set of macro components allocated for an accelerator may include macro components from two or more FPGA devices. Therefore, the accelerator can be implemented in multiple FPGAs even in some situations where no single FPGA has enough available macro components to accommodate the accelerator design.

Once the macro components have been allocated by the resource allocation module 413, the configuration logic 414 implements the design in the FPGA devices by configuring the set of allocated macro components according to the design definition. For each of the tiles specified in the design definition, the configuration logic 414 programs the corresponding allocated tile using the bitfile specified in the design definition for the specified tile. In one embodiment, the configuration logic 414 programs the FPGA devices via the configuration port 415. Alternatively, programming of the FPGA devices may be invoked via the communication interface 410. In one embodiment, configuration data (e.g., bitfiles or bitstreams) may be transmitted via communication interface 410 to the local macro schedulers (e.g., 131-133) of the FPGA devices 121-123 to be programmed, and the programming of the macro components is performed by each FPGA device's respective local macro scheduler.

The macro scheduler 130 includes synthesis logic 416, which is used for synthesizing, performing place and route, or other processes on designs received from client devices such as clients 110 and 111. In one embodiment, synthesis can be performed on a RTL design in the synthesis logic 416 of the macro scheduler 130 rather than in the client device.

The synthesis logic 416 also allows the macro scheduler 130 to perform a second pass optimization for a design while the design is already configured and operating in one or more of the FPGA devices 121-123. In this situation, the initial configuration for the design is indicated in the design definition (e.g., as one or more bitfiles) and used for configuring the allocated macro components in the FPGA devices 121-123. During execution of a specified task in the initial configuration, the synthesis logic 416 automatically generates an optimized configuration for the design by performing synthesis and place and route computations for the design. Execution of the task is paused in the initial configuration, the architectural state (e.g., registers, memory, etc.) is saved, and the configuration logic 414 reprograms the FPGA devices to replace the initial configuration with the optimized configuration. The state is then restored and execution of the task is then restarted in the optimized configuration.

If the second pass optimization causes changes in the input and/or output port locations (e.g., for control, data, and result ports) for the design, the synthesis logic 416 also generates a remap notification that correlates the initial port locations in the initial configuration with the optimized port locations in the optimized configuration so that any processes relying on these ports can still locate them. In alternative embodiments, a hardware remapping of the ports is performed by the FPGA.

In one embodiment that includes both a standalone macro scheduler 130 and local macro schedulers 131-133, computationally intensive work (e.g., synthesis and place and route) is performed on the standalone macro scheduler 130, while less computationally intensive work is performed on the local macro schedulers 131-133. In particular, the local macro schedulers 131-133 may perform such functions as allocating macro components or performing placement for accelerators within their own respective FPGA devices 121-123.

While the functions of the macro scheduler 130 are described in the above embodiments as being performed by different circuit modules, the modules in macro scheduler 130 can in alternative embodiments be implemented using micro-code or software modules. In some embodiments, the functions of the macro scheduler 130 can be implemented partially in software and partially in hardware. In some embodiments, the macro scheduler 130 functions can be divided in many different ways between one or more standalone macro schedulers (e.g., 130), one or more local macro schedulers (e.g., 131-133), or client devices (e.g., 110-111). For example, the tile-level synthesis and/or place and route processes could be performed by the requesting client, a local macro scheduler, or a standalone macro scheduler device.

In one embodiment, the macro scheduler 130 also performs computationally demanding tasks, such as the initial synthesis and place and route processes, instead of the client device, so that the client device can be a less powerful computer (e.g., a mobile device). Alternatively, if a client device is sufficiently powerful and has spare computing cycles, the client device may assist with the macro scheduling functions. In one embodiment, the client devices can also include hardware accelerators for performing these functions.

Figure 5:
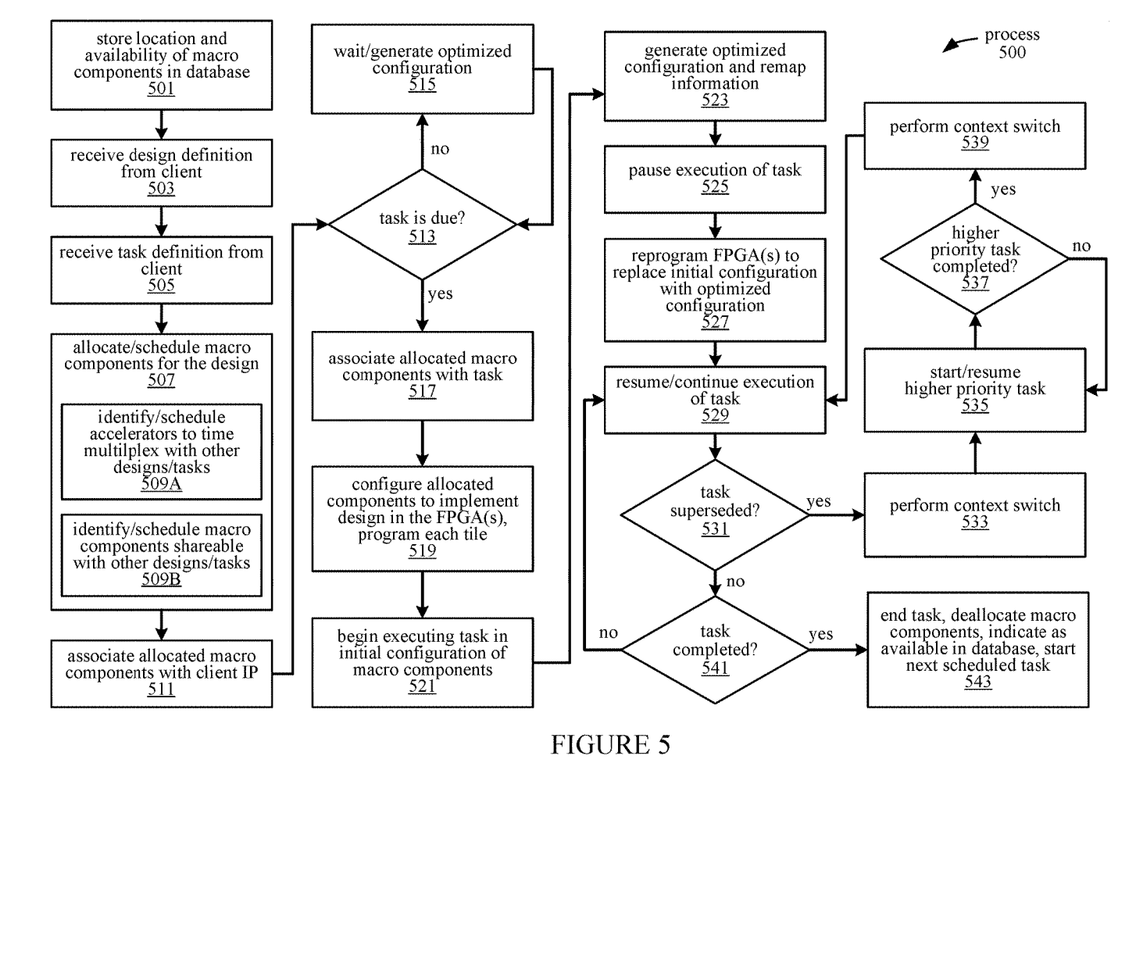
FIG. 5 is a flow diagram illustrating a process for configuring FPGA devices and for performing macro scheduling functions, according to an embodiment.

FIG. 5 is a flow diagram illustrating a process 500 for configuring one or more FPGA devices based on a design definition from a client, and for performing other functions of a macro scheduler such as a second pass optimization and context switching. The process 500 is performed for each of multiple tasks executed in the FPGA devices 121-123, and these processes 500 may overlap in time. In one embodiment, the operations in process 500 are performed by macro scheduler 130. Alternatively, the operations in process 500 may be performed in local macro schedulers 131-133 and/or client devices 110-111 or in a combination of the standalone macro scheduler 130, local macro schedulers 131-133, and client devices 110-111.

At block 501, the database 420 stores information indicating a location and availability of macro components for the FPGA devices 121-123. The database 420 enumerates the macro components in the FPGA devices 121-123 by including a 'macro' field 421 that stores a unique identifier for each macro component. The location of the macro component is stored in the 'location' field 422 of the database 420. In one embodiment, the 'client IP' field 423, 'PID' field 424, 'task' field 425, and/or 'schedule' field 426 indicate the availability of the macro component (i.e., whether the macro component is unallocated). From block 501, the process 500 continues at block 503.

At block 503, the API module 411 of the macro scheduler 130 receives a design definition from a first client device 110. The received design definition indicates one or more macro components to be used in the design. The design definition also indicates how the macro components are to be connected in a macro graph (e.g., 'myAccelerator' in the earlier example). From block 503, the process 500 continues at block 505.

At block 505, the API module 411 receives a task definition from the client 110. The task definition defines a task in terms of actions to be performed using the macro graph in the previously received design definition. For example, the task definition may specify input values for the accelerator defined by the macro graph and request execution and read out of the resulting output values. From block 505, the process 500 continues at block 507.

At block 507, the resource allocation logic 413 allocates macro components for the design by allocating one of the macro components enumerated in the database 420 that is indicated as available for each of the macro components specified in the design definition. Macro components allocated to the design may be from the same FPGA device, or from different FPGA devices. Macro components from same FPGA can be allocated to different designs. For example, the API module 411 may receive a first design defined by a first design definition and a second design defined by a second design definition from the same or from different client devices. The resource allocation logic 413 allocates a first set of macro components for the first design and a second set of macro components for the second design, where macro components from the first set are located in the same FPGA device as macro components in the second set.

In one embodiment, the macro components are allocated for specific time periods (i.e., scheduled); for example, a macro component may be allocated to a first design during one time period and to a second design during a different time period. For accelerator designs defined by macro graphs having multiple macro components, the resource allocation logic 413 may identify a time period during which all of the macro components specified in the design are available and can be scheduled. In one embodiment, the resource allocation logic 413 optimizes the scheduling of multiple designs from the same client or multiple different clients to maximize usage of the macro components over time.

The resource allocation logic 413 also schedules execution of the task defined by the task definition by identifying one or more time periods in which the task can be executed in the allocated macro components that are configured to implement the accelerator design. In one embodiment, multiple tasks can be defined that use the same accelerator design; the resource allocation logic 413 schedules these tasks to use the accelerator during different time periods. The scheduling process 507 by the resource allocation logic 413 includes additional optimization steps 509A and 509B.

At block 509A, the resource allocation logic 413 identifies accelerators from the design that can be time multiplexed with accelerators from other designs. For example, if two different designs (from the same or different clients) both use the same accelerator (e.g., the same types of macro components connected in the same manner), then the accelerator can be configured once and used for both designs. The resource allocation logic 413 schedules execution of a first task in the accelerator during a first time period and schedules execution of a second task in the same accelerator during a second time period that is non-overlapping with the first time period.

At block 509B, the resource allocation logic 413 identifies macro components that can be shared between multiple designs. For example, a first design and a second design may each request 8 bits of memory; therefore, the resource allocation logic 413 can allocate a single 16-bit memory macro component to be shared between both designs. Thus, unused bits from a macro component can be allocated to another design. Macro components for input and output ports can be similarly shared between designs.

At block 511, the resource tracking module 412 updates the database 420 to associate each of the allocated macro components with a network address (e.g., an IP address) of the client 110 from which the design originated by storing the IP address of the client 110 in the row associated with the macro component in database 420. The resource tracking module 412 also associates each of the allocated macro components with the task by storing an identifier for the task in the row associated with each of the allocated macro components in database 420. From block 511, the process 500 continues at block 513.

Once the macro components have been allocated for the received design, the process 500 determines at block 513 whether the task to be executed in the design (as specified in the task definition) is due for execution, according to the schedule for the task previously determined at block 507. If the task is not due for execution, the process 500 continues at block 515. The process 500 waits for the task to become due by cycling between blocks 515 and 513 until the task is due. During this waiting period, the synthesis logic 416 may perform a second-pass optimization by performing synthesis and place and route procedures for the design. In one embodiment, the second-pass optimization is performed using an RTL level design received from the client, and is based on the macro components that were actually allocated for executing the design and/or based on other designs that share some or all of the same allocated macro components or are scheduled at the same time.

At block 513, if the task is due for execution, the process 500 continues at block 517. At block 517, the resource tracking logic 412 updates the database 420 to associate the allocated macro components with the task. The resource tracking logic 412 writes an identifier for the task into the 'task' field 425 that corresponds to each of the allocated macro components of the accelerator in which the task will be executed. From block 517, the process 500 continues at block 519.

At block 519, the configuration logic 414 implements the design in the set of FPGA devices by configuring the set of allocated macro components according to an initial configuration specified in the design definition or an optimized configuration generated by a second pass optimization process 515. In one embodiment, a design definition specifies one or more tiles as part of a macro graph, and further indicates a bitfile for configuring each of the specified tiles. Accordingly, for each of the specified tiles, the configuration logic 414 configures a corresponding allocated tile from the set of allocated macro components using the bitfile indicated for the specified tile. In one embodiment, the allocated tile is configured by writing contents of the bitfile to a configuration register of the tile. If a second pass optimization was already performed for the design (e.g., while waiting for execution at block 515), then the optimized configuration generated from the second pass optimization is used instead of the initial configuration originally specified in the design definition. From block 519, the process 500 continues at block 521.

At block 521, the configuration logic 414 indicates that the configuration is complete and the execution of the task in the configured macro components begins. At block 523, if the second-pass optimization was not already performed at block 515, then the second-pass optimization is performed while the task is being executed in the initial configuration. The synthesis logic 416 thus generates an optimized configuration for the design while waiting for the task to begin execution (i.e., at block 515) or while the task is being executed (i.e., at block 523). In one embodiment, the second pass optimization may be partially performed at block 515 and completed at block 523. The second pass optimization generates configuration data (e.g., bitfiles, bitstreams) and remapping information for input or output ports that in the optimized configuration are moved relative to the initial configuration. From block 523, the process 500 continues at block 525.

At block 525, the execution of the task is paused. In one embodiment, the task is paused by stopping clock signals supplied to the macro components in which the task is being executed. While the task is paused, the memory and register state for the task is saved. From block 525, the process 500 continues at block 527.

At block 527, the configuration logic 414 reprograms the macro components in the FPGA devices to replace the initial configuration with the optimized configuration generated at block 523. A remap notification is also generated from the remapping information that correlates initial port locations in the initial configuration with the optimized port locations in the optimized configuration. The remap notification allows other processes to find the new input and output port locations. Alternatively, the port locations may be remapped in the FPGA hardware. The previously saved register and memory state for the task is restored to the reconfigured macro components, which may include remapping register and memory locations, if these locations have changed in the optimized configuration. When switching to an optimized design, it is also possible that some of the previously saved register and memory state may become redundant. In one embodiment, the optimization process determines identifies state bits that are no longer used in the optimized configuration, then modifies the saved context for the task to fit the new optimized configuration (e.g., by deleting all state bits for signals identified as no longer used) prior to restarting execution of the task using the optimized configuration. From block 527, the process 500 continues at block 529.

At block 529, execution of the task is restarted in the optimized configuration of the macro components in the FPGA devices. In one embodiment, execution is resumed by restarting the clock signal supplied to the macro components.

Blocks 531-539 include operations for performing a context switch so that a higher priority task can be performed in macro components that are already being used. At block 531, if the original task is not superseded by such a higher priority task, the process continues at block 541. At block 541, if the original task has not completed, the process 500 continues back to block 529, where execution of the original task continues. Thus, blocks 529, 531, and 541 are repeated until the original task is superseded or completed. At block 531, if the original task is superseded by a higher priority task requesting use of the macro components in which the original task is being executed, the process 500 continues at block 533. In one embodiment, the superseding of the original task at block 531 corresponds to the higher priority task coming due at block 513 in another instance of process 500 being performed for the higher priority task.

At block 533, the resource allocation logic 413 performs a context switch to allow the higher priority task to be executed. The register and memory state of the original task is saved and the macro components are reconfigured to another design for executing the higher priority task. Execution of the higher priority task is started at block 535 and continues until, at block 537, the task is completed. The blocks 535 and 537 performed for the original task correspond to blocks 517-543 in the other instance of process 500 performed for the higher priority task. When the higher priority task is completed, the process 500 continues from block 500 to block 539. At block 539, the resource allocation logic 413 performs a context switch to resume execution of the original task. The saved register and memory state is restored and the macro components are reconfigured to implement the design for executing the original task.

Execution of the original task continues until the task is completed. At block 541, if the task is completed, the process 500 continues at block 543. At block 543, the task is ended, the macro components that were used by the task are deallocated and made available for new designs, if they are not being used in other designs. The database rows for the deallocated macro components are updated in the database 420 by the resource tracking logic 412, which clears the 'task' 425 and 'client IP' 423 fields. A next scheduled task is started (i.e., from its own block 513) that may use the newly deallocated macro components.

According to the operation of process 500, the local macro schedulers 131-133 and/or standalone macro scheduler 130 provide a mechanism for allocating and scheduling macro components according to a macro graph in a design definition. The macro graph defines an accelerator to be implemented in the FPGA devices 121-123. Through the use of the API 411, a user can create a function to be implemented as a hardware accelerator in the FPGA devices 121-123, and can also assign input data for the function and read the resulting outputs in a virtualized manner. Through resource sharing, time multiplexing, and other optimization approaches, the virtualization of the FPGA resources allows more efficient allocation and scheduling of FPGA hardware resources when servicing multiple clients.

A macro scheduler includes a resource tracking module configured to update a database enumerating a plurality of macro components of a set of field programmable gate array (FPGA) devices, a communication interface configured to receive from a first client device a first design definition indicating one or more specified macro components for a design, resource allocation logic configured to allocate a first set of macro components for the design by allocating one of the plurality of macro components for each of the one or more specified macro components indicated in the first design definition, and configuration logic configured to implement the design in the set of FPGA devices by configuring the first set of allocated macro components according to the first design definition.

In the macro scheduler, the first design definition includes a macro graph defining connections between the one or more specified macro components and indicating a type of each of the one or more specified macro components.

In the macro scheduler, the one or more specified macro components include one or more specified tiles, one or more specified fixed function units, and one or more specified registers. The first design definition further indicates a bitfile for each of the one or more specified tiles. For each specified tile of the one or more specified tiles, the configuration logic is configured to program an allocated tile in the first set of macro components based on the bitfile for the specified tile.

In the macro scheduler, the resource tracking module is further configured to associate each of the first set of macro components with a network address of the first client device and with a first task requested by the first client device.

In the macro scheduler, the resource tracking module is further configured to, for each macro component of the plurality of macro components, record in the database a location of the macro component in the set of FPGA devices and an availability of the macro component.

The macro scheduler also includes synthesis logic configured to, during execution of a task in an initial configuration of the set of FPGA devices, generate an optimized configuration for the design, and generate a remap notification correlating initial port locations in the initial configuration with optimized port locations in the optimized configuration. The initial configuration is indicated by the first design definition, and the configuration logic is further configured to reprogram the set of FPGA devices to replace the initial configuration with the optimized configuration prior to restarting execution of the task in the optimized configuration of the set of FPGA devices.

In the macro scheduler, the first design definition includes a definition for an accelerator. The resource allocation logic is further configured to schedule execution in the accelerator of a first task from the first client device during a first time period and schedule execution in the accelerator of a second task from a second client device during a second time period.

In the macro scheduler, the resource allocation logic is further configured to allocate a second set of the plurality of macro components for a second design defined by a second design definition received from a second client device. A first subset of macro components in the first set of macro components is located in the same FPGA device of the set of FPGA devices as a second subset of macro components in the second set of macro components.

In the macro scheduler, the first set of macro components includes macro components of at least two different FPGA devices of the plurality of FPGA devices.

A method of operating a macro scheduler includes updating a database enumerating a plurality of macro components of a set of field programmable gate array (FPGA) devices, receiving from a first client device a first design definition indicating one or more specified macro components for a design, allocating a first set of macro components for the design by allocating one of the plurality of macro components for each of the one or more specified macro components indicated in the first design definition, and implementing the design in the set of FPGA devices by configuring the first set of allocated macro components according to the first design definition.

In the method, the one or more specified macro components include one or more specified tiles, and the first design definition further indicates a bitfile for each of the one or more specified tiles. The method also includes, for each specified tile of the one or more specified tiles, programming an allocated tile in the first set of macro components based on the bitfile for the specified tile.

The method also includes associating each of the first set of macro components with a network address of the first client device and with a first task requested by the first client device.

The method also includes, for each macro component of the plurality of macro components, recording in the database a location of the macro component in the set of FPGA devices and an availability of the macro component.

The method also includes, during execution of a task in an initial configuration of the set of FPGA devices, generating an optimized configuration for the design, reprogramming the set of FPGA devices to replace the initial configuration with the optimized configuration prior to restarting execution of the task in the optimized configuration of the set of FPGA devices, and generating a remap notification correlating initial port locations in the initial configuration with optimized port locations in the optimized configuration. The initial configuration is indicated by the first design definition.

In the method, the first design definition includes a definition for an accelerator. The method also includes scheduling execution in the accelerator of a first task from the first client device during a first time period, and scheduling execution in the accelerator of a second task from a second client device during a second time period.

The method also includes allocating a second set of the plurality of macro components for a second design defined by a second design definition received from a second client device. A first subset of macro components in the first set of macro components is located in the same FPGA device of the set of FPGA devices as a second subset of macro components in the second set of macro components.

A computing system includes a set of field programmable gate array (FPGA) devices including a plurality of macro components, a database configured to enumerate the plurality of macro components, and a standalone macro scheduler. The standalone macro scheduler includes a resource tracking module configured to update the database, a communication interface configured to receive from a first client device a first design definition indicating one or more specified macro components for a design, resource allocation logic configured to allocate a first set of macro components for the design by allocating one of the plurality of macro components for each of the one or more specified macro components indicated in the first design definition, and configuration logic configured to implement the design in the set of FPGA devices by configuring the first set of allocated macro components according to the first design definition.

The system also includes a first client device. The standalone macro scheduler also includes an application programming interface (API) configured to initiate the allocating by the resource allocation logic and the configuring by the configuration logic in response to commands from the first client device.

In the system, each of one or more FPGA devices of the set of FPGA devices includes a local macro scheduler configured to determine a placement for at least one of the allocated macro components in the one or more FPGA devices.

The system also includes a plurality of network channels connecting the set of FPGA devices to the standalone macro scheduler.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A macro scheduler, comprising:
a resource tracking module configured to update a database enumerating a plurality of macro components of a set of field programmable gate array (FPGA) devices;
a communication interface configured to receive from a first client device a first design definition indicating one or more specified macro components for a design;
resource allocation logic configured to allocate a first set of macro components for the design by allocating one of the plurality of macro components for each of the one or more specified macro components indicated in the first design definition; and
configuration logic configured to implement the design in the set of FPGA devices by configuring the first set of allocated macro components according to the first design definition.

2. The macro scheduler of claim 1, wherein the first design definition comprises a macro graph defining connections between the one or more specified macro components and indicating a type of each of the one or more specified macro components.

3. The macro scheduler of claim 2, wherein:
the one or more specified macro components comprise one or more specified tiles, one or more specified fixed function units, and one or more specified registers;
the first design definition further indicates a bitfile for each of the one or more specified tiles; and
for each specified tile of the one or more specified tiles, the configuration logic is configured to program an allocated tile in the first set of macro components based on the bitfile for the specified tile.

4. The macro scheduler of claim 1, wherein the resource tracking module is further configured to associate each of the first set of macro components with a network address of the first client device and with a first task requested by the first client device.

5. The macro scheduler of claim 1, wherein the resource tracking module is further configured to, for each macro component of the plurality of macro components, record in the database a location of the macro component in the set of FPGA devices and an availability of the macro component.

6. The macro scheduler of claim 1, further comprising synthesis logic configured to:
during execution of a task in an initial configuration of the set of FPGA devices, wherein the initial configuration is indicated by the first design definition, generate an optimized configuration for the design, wherein the configuration logic is further configured to reprogram the set of FPGA devices to replace the initial configuration with the optimized configuration prior to restarting execution of the task in the optimized configuration of the set of FPGA devices; and generate a remap notification correlating initial port locations in the initial configuration with optimized port locations in the optimized configuration.

7. The macro scheduler of claim 1, wherein the first design definition comprises a definition for an accelerator, and wherein the resource allocation logic is further configured to:

schedule execution in the accelerator of a first task from the first client device during a first time period, and schedule execution in the accelerator of a second task from a second client device during a second time period.

8. The macro scheduler of claim 1, wherein the resource allocation logic is further configured to allocate a second set of the plurality of macro components for a second design defined by a second design definition received from a second client device, wherein a first subset of macro components in the first set of macro components is located in the same FPGA device of the set of FPGA devices as a second subset of macro components in the second set of macro components.

9. The macro scheduler of claim 1, wherein the first set of macro components comprises macro components of at least two different FPGA devices of the plurality of FPGA devices.

10. A method, comprising:

updating a database enumerating a plurality of macro components of a set of field programmable gate array (FPGA) devices;

receiving from a first client device a first design definition indicating one or more specified macro components for a design;

allocating a first set of macro components for the design by allocating one of the plurality of macro components for each of the one or more specified macro components indicated in the first design definition; and implementing the design in the set of FPGA devices by configuring the first set of allocated macro components according to the first design definition.

11. The method of claim 10, wherein:

the one or more specified macro components comprise one or more specified tiles;

the first design definition further indicates a bitfile for each of the one or more specified tiles; and the method further comprises:

for each specified tile of the one or more specified tiles, programming an allocated tile in the first set of macro components based on the bitfile for the specified tile.

12. The method of claim 10, further comprising:

associating each of the first set of macro components with a network address of the first client device and with a first task requested by the first client device.

13. The method of claim 10, further comprising:

for each macro component of the plurality of macro components, recording in the database a location of the macro component in the set of FPGA devices and an availability of the macro component.

14. The method of claim 10, further comprising:

during execution of a task in an initial configuration of the set of FPGA devices, wherein the initial configuration is indicated by the first design definition, generating an optimized configuration for the design;

reprogramming the set of FPGA devices to replace the initial configuration with the optimized configuration prior to restarting execution of the task in the optimized configuration of the set of FPGA devices; and generating a remap notification correlating initial port locations in the initial configuration with optimized port locations in the optimized configuration.

15. The method of claim 10, wherein the first design definition comprises a definition for an accelerator, and wherein the method further comprises:

scheduling execution in the accelerator of a first task from the first client device during a first time period, and scheduling execution in the accelerator of a second task from a second client device during a second time period.

16. The method of claim 10, further comprising:

allocating a second set of the plurality of macro components for a second design defined by a second design definition received from a second client device, wherein a first subset of macro components in the first set of macro components is located in the same FPGA device of the set of FPGA devices as a second subset of macro components in the second set of macro components.

17. A system, comprising:

a set of field programmable gate array (FPGA) devices comprising a plurality of macro components;

a database configured to enumerate the plurality of macro components; and a standalone macro scheduler, comprising:

a resource tracking module configured to update the database;

a communication interface configured to receive from a first client device a first design definition indicating one or more specified macro components for a design;

resource allocation logic configured to allocate a first set of macro components for the design by allocating one of the plurality of macro components for each of the one or more specified macro components indicated in the first design definition; and configuration logic configured to implement the design in the set of FPGA devices by configuring the first set of allocated macro components according to the first design definition.

18. The system of claim 17, further comprising a first client device, wherein the standalone macro scheduler further comprises:

an application programming interface (API) configured to initiate the allocating by the resource allocation logic and the configuring by the configuration logic in response to commands from the first client device.

19. The system of claim 17, wherein each of one or more FPGA devices of the set of FPGA devices comprises a local macro scheduler configured to determine a placement for at least one of the allocated macro components in the one or more FPGA devices.

20. The system of claim 17, further comprising a plurality of network channels connecting the set of FPGA devices to the standalone macro scheduler.

* * * * *